(12) United States Patent
Alicherry et al.

(10) Patent No.: US 7,835,271 B2
(45) Date of Patent: Nov. 16, 2010

(54) SIGNALING PROTOCOL FOR P-CYCLE RESTORATION

(75) Inventors: Mansoor Ali Khan Alicherry, Scotch Plains, NJ (US); Peter Hessler, Erlangen (DE); Viswanath Poosala, Basking Ridge, NJ (US); Walter Rothkegel, Nuremberg (DE); Sudipta Sengupta, Malden, MA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 875 days.

(21) Appl. No.: 11/321,549

(22) Filed: Dec. 29, 2005

(65) Prior Publication Data

US 2007/0153674 A1 Jul. 5, 2007

(51) Int. Cl.
*G01R 31/08* (2006.01)
(52) U.S. Cl. ................ 370/221; 370/225; 714/25
(58) Field of Classification Search ............ None
See application file for complete search history.

(56) References Cited

U.S. PATENT DOCUMENTS

| | | | | |
|---|---|---|---|---|
| 5,444,693 | A * | 8/1995 | Arslan et al. | 370/221 |
| 6,147,966 | A * | 11/2000 | Johnson et al. | 370/221 |
| 7,042,838 | B1 * | 5/2006 | Shand et al. | 370/225 |
| 7,046,929 | B1 * | 5/2006 | Hester et al. | 398/17 |
| 7,406,032 | B2 * | 7/2008 | Li et al. | 370/217 |
| 2002/0067693 | A1 * | 6/2002 | Kodialam et al. | 370/216 |
| 2002/0116669 | A1 * | 8/2002 | Jain | 714/43 |
| 2003/0014516 | A1 * | 1/2003 | Blackmore et al. | 709/224 |
| 2003/0169692 | A1 * | 9/2003 | Stern et al. | 370/242 |
| 2003/0233595 | A1 * | 12/2003 | Charny et al. | 714/4 |

OTHER PUBLICATIONS

Rachna Asthana, Removal of Loop Back in p-cycle Protection: Second Phase Reconfiguration, Aug. 2006, pp. 1-3.*
W.D. Grover et al., "Cycle-Oriented Distributed Preconfiguration: Ring-Like Speed with Mesh-Like Capacity for Self-Planning Network Restoration," Proceedings of IEEE ICC '98, pp. 537-543, Jun. 1998.
W.D. Grover et al., "Bridging the Ring-Mesh Dichotomy with P-Cycles," Proceedings of Design of Reliable Communication Networks (DRCN 2000), Technical University of Munich, Session 5, 13 pages, Apr. 2000.

* cited by examiner

*Primary Examiner*—Seema S Rao
*Assistant Examiner*—Rhonda Murphy
(74) *Attorney, Agent, or Firm*—Ryan, Mason & Lewis, LLP

(57) ABSTRACT

Improved p-cycle restoration techniques using a signaling protocol are disclosed. For example, a technique for use in at least one node of a data communication network for recovering from a failure, wherein the data communication network includes multiple nodes and multiple links for connecting the multiple nodes, comprises the following steps/operations. Notification of the failure is obtained at the at least one node. A determination is made whether the failure is a single link failure or one of a node failure and a multiple link failure. A pre-configured protection cycle (p-cycle) plan is implemented when the failure is a single link failure but not when the failure is one of a node failure and a multiple link failure, such that two independent paths in the network are not connected when implementing the pre-configured protection cycle plan. Implementation of the pre-configured protection cycle plan may further comprise the node sending at least one message to another node in the data communication network and/or receiving at least one message from another node in the data communication network.

20 Claims, 5 Drawing Sheets

SIGNALING PROTOCOL FOR P-CYCLE RESTORATION

FIELD OF THE INVENTION

The present invention relates generally to the field of data communication networks and, more particularly, to signaling techniques for use in p-cycle restoration.

BACKGROUND OF THE INVENTION

It is generally known that data communication networks known as optical transport networks or OTNs are mostly based on a ring-based architecture. Rings are typically easy to manage and offer a fast way for protection switching. Unfortunately, they tend to be capacity-inefficient and can require more than twice the working capacity for protection. Mesh-based networks, on the other hand, require much less spare capacity, but have the drawback of complicated protection mechanisms. Therefore, several protection techniques for the transition of ring networks towards mesh-based networks have been considered.

One such protection technique is known as pre-configured protection cycles or p-cycle protection. In p-cycle protection, the spare capacity for span protection is organized in cycles and shared among on-cycle links and straddling links of the cycle. In this way, a redundancy lower than 50% for protection is achievable, while still retaining the speed associated with the use of rings.

Thus, p-cycle protection or restoration has been proposed in mesh networks for achieving ring-like restoration speed with mesh-like capacity efficiency. Ring-speed arises because only two nodes perform any real-time actions for each restored signal unit, and such actions are fully predetermined before failure and are triggered by each node detecting the failure autonomously. The surprising capacity efficiency is the less obvious property but it is ultimately attributable to the aspect of protecting straddling link failures as well as on-cycle failures. This seemingly small difference between a ring and a p-cycle actually leads to major differences in protection capacity requirements.

While the p-cycle scheme promises ring-like restoration speed at mesh-like capacity efficiency, there are many aspects of the p-cycle scheme from a carrier class deployment perspective that have not received much attention so far. These, if not properly addressed, could become a stumbling block for any future deployment of p-cycle restoration in carrier networks.

First, p-cycles assume single link failure. Node failures and multiple link failures can occur in a real network. In the presence of these failures, p-cycle restoration suffers from the same misconnection problem that is solved in a Multiplex Section Protection Ring/Bi-directional Line Switched Ring (or MS-SPRING/BLSR) architecture through squelching. This requires a signaling protocol after failure, which may impact the restoration latency.

Second, p-cycles do not protect against node failures. Node-encircling p-cycles have been proposed to handle this problem. Node-encircling p-cycles may require a higher degree of meshing and additional backup capacity and therefore also reduce capacity savings.

Third, implementing p-cycles in a dynamic setting, where p-cycles are setup as the demand arrives, has to guarantee that contiguous concatenation requirements associated with a Synchronous Optical Network (SONET) architecture or a Synchronous Digital Hierarchy (SDH) architecture are satisfied. This leads to fragmentation and bandwidth constraints around the cycle and again may limit the capacity savings.

SUMMARY OF THE INVENTION

The present invention provides improved p-cycle restoration by use of a signaling protocol.

For example, in one aspect of the invention, a technique for use in at least one node of a data communication network for recovering from a failure, wherein the data communication network includes multiple nodes and multiple links for connecting the multiple nodes, comprises the following steps/operations. Notification of the failure is obtained at the at least one node. A determination is made whether the failure is a single link failure or one of a node failure and a multiple link failure. A pre-configured protection cycle (p-cycle) plan is implemented when the failure is a single link failure but not when the failure is one of a node failure and a multiple link failure, such that two independent paths in the network are not connected when implementing the pre-configured protection cycle plan.

Implementation of the pre-configured protection cycle plan may further comprise the node at least one of sending at least one message to another node in the data communication network and receiving at least one message from another node in the data communication network. The at least one message may comprise one or more of an identifier of the pre-configured protection cycle plan, an identifier of a channel in the pre-configured protection cycle plan, and a command. The at least one message may serve to reserve one or more resources. Reservation of the one or more resources is preferably performed before resource bridging and resource switching are completed. The at least one message may serve to acknowledge successful reservation of one or more resources. The at least one message may serve to release a reservation of one or more resources. Further, the node may store a status associated with one or more resources for use in implementing the pre-configured protection cycle plan.

In one illustrative embodiment, the data communication network comprises an optical transport network and implementation of the pre-configured protection cycle plan comprises setting up one or more optical cross-connects in the network such that traffic associated with a demand may be switched from a primary path to a backup path in order to recover from the failure.

In another aspect of the invention, a technique for use in an optical transport network for recovering from a failure, wherein the optical transport network includes multiple nodes and multiple links for connecting the multiple nodes, comprises determining whether the failure is a single link failure or one of a node failure and a multiple link failure. A pre-configured protection cycle (p-cycle) plan is then implemented when the failure is a single link failure but not when the failure is one of a node failure and a multiple link failure, such that two independent paths in the network are not connected when implementing the pre-configured protection cycle plan. Implementation of the pre-configured protection cycle plan comprises at least two nodes communicating in accordance with a signaling protocol in an attempt to reserve one or more cross-connects.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that while principles of the invention will be described below the context of a SONET/SDH environment, the invention is not so limited. That is, the present invention is more generally applicable to any connection-oriented or circuit-switched network in which it would be desirable to provide improved restoration techniques.

Prior to describing illustrative principles of the invention, a detailed overview of p-cycle restoration is provided.

I. P-cycles

The concept of p-cycles was introduced by W. D. Grover and D. Stamatelakis, "Cycle-oriented Distributed Pre-configuration: Ring-like Speed with Mesh-like Capacity for Self-planning Network Restoration," Proc. IEEE International Conf. Commun. (ICC '98), Atlanta, pp. 537-543, June 1998. For a given set of demands, a protection structure is pre-computed and set-up, such that upon a single link failure, protection actions are fully determined at the two adjacent nodes to the link failure.

Figure 1:
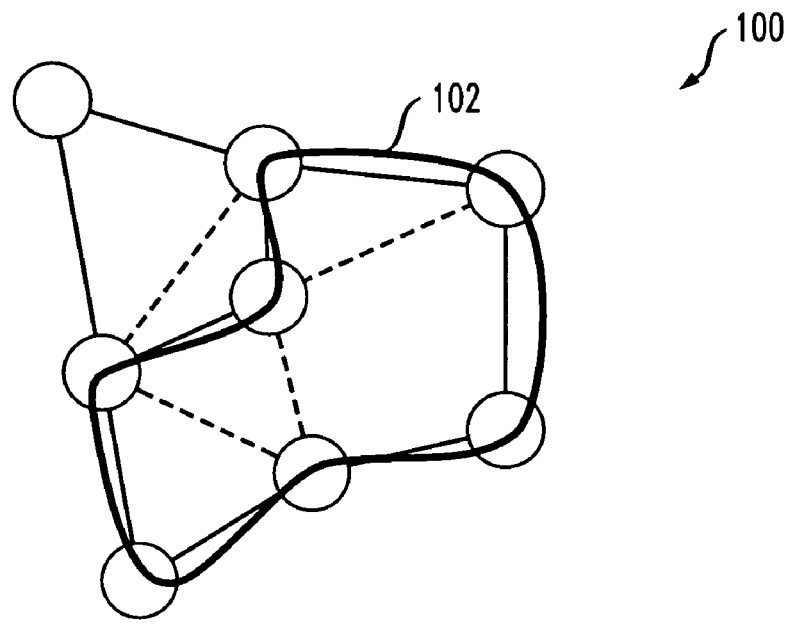
FIG. 1 is a diagram illustrating an example network with one p-cycle over seven hops.

FIG. 1 shows an example 100 of a network (e.g., an OTN) with one p-cycle 102 over seven hops. It is to be understood that each circle represents a node in the network. Nodes are coupled via links. A node represents a network device or element such as, by way of example, a router or a switch. It is understood that such a network device or element contains one or more cross-connects, which are used to connect links and therefore nodes, as is well known in the art. Links represent the communication paths between such devices or elements. A hop represents the traversal of data over a link from one node to another node.

Figure 2:
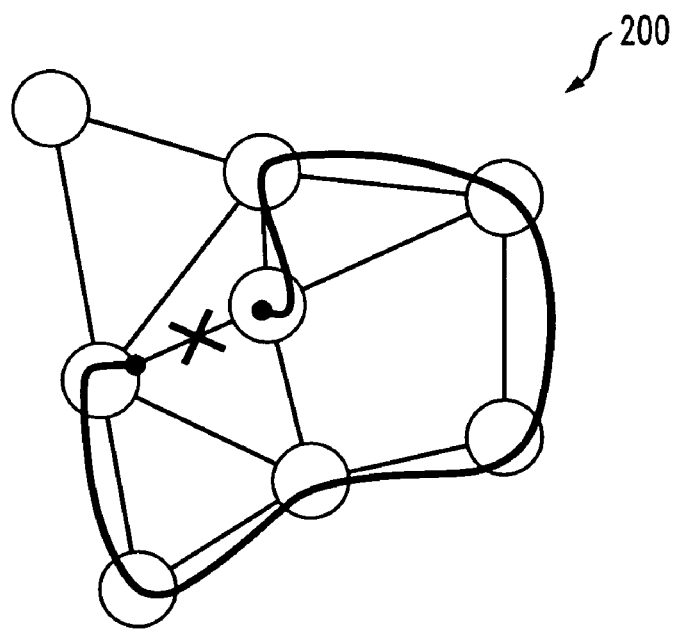
FIG. 2 is a diagram illustrating an on-cycle failure in accordance with the network of FIG. 1.

A single p-cycle protects against two types of failures:

On-cycle failures: A failure on a link that is part of the p-cycle itself. This looks like a traditional ring protection, where traffic is sent around the long way in the ring (including use of one or more non-failing links) upon a failure. This is illustrated in example 200 of FIG. 2.

Figure 3:
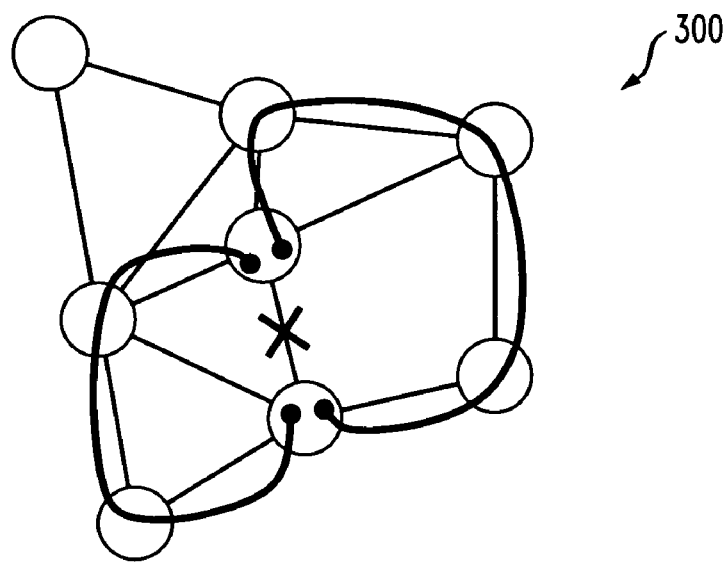
FIG. 3 is a diagram illustrating a straddling link failure in accordance with the network of FIG. 1.

Straddling link failures: A failure on a link, which has both end nodes on the p-cycle, but is not part of the p-cycle itself. It can be protected by two ways along the p-cycle and does not require extra backup capacity. Its associated backup capacity is distributed to the two ways on the cycle. Example 300 of FIG. 3 demonstrates this case. Straddling links have been drawn as dashed lines in FIG. 1. Note that the straddling links can be outside the p-cycle.

The p-cycle in FIG. 1 has 7 on-cycle links and 4 straddling links. Therefore, this arrangement can protect 7+2*4=15 units of working traffic by 7 units of protection capacity.

P-cycles were first introduced with Dense Wavelength Division Multiplexing (DWDM) networks in mind. But p-cycles claim to be a generic concept, which can be applied to any technology such as DWDM, SDH/SONET, or Multi Protocol Label Switching/Asynchronous Transfer Mode (MPLS/ATM). While principles of the invention may be applied to other networks, the illustrative embodiments described herein focuses on p-cycles in an SDH/SONET network and on what we denote as carrier-class requirements.

When p-cycles are compared with MS-SPRING/BLSR for their 50 millisecond protection times, it seems fair to also check, whether other properties of MS-SPRING/BLSR networks are met.

In the following we evaluate three aspects, which are important for a carrier class deployment:

Avoiding of misconnections: It should be ensured that due to protection or restoration actions in the network, no traffic is sent to the wrong destination.

Handling of node failures: Even if complete node failures seem to be rare events due to 1+1 equipment protection of critical functions, redundant power supply etc., they can not be excluded completely and should be taken into account when planning for protection or restoration capacity.

Considering SDH/SONET contiguous concatenation: Bandwidth fragmentation is a well-known issue in SDH/SONET networks. When SDH/SONET paths of different band width (e.g., vc3, vc4, vc4-4c, vc4-16c and their SONET equivalents) are provisioned, they can only start on dedicated positions and must allocate contiguous timeslots. Adding and removing such paths fragments creates holes in the transport pipe and may lead to unusable bandwidth.

We address these three issues (i.e., misconnection avoidance, node failure, and fragmentation) further below.

A. Avoiding Misconnections

Using p-cycles upon a link failure, both adjacent nodes act independently and bridge the traffic to the pre-computed protection route without any further synchronization.

Figure 4:
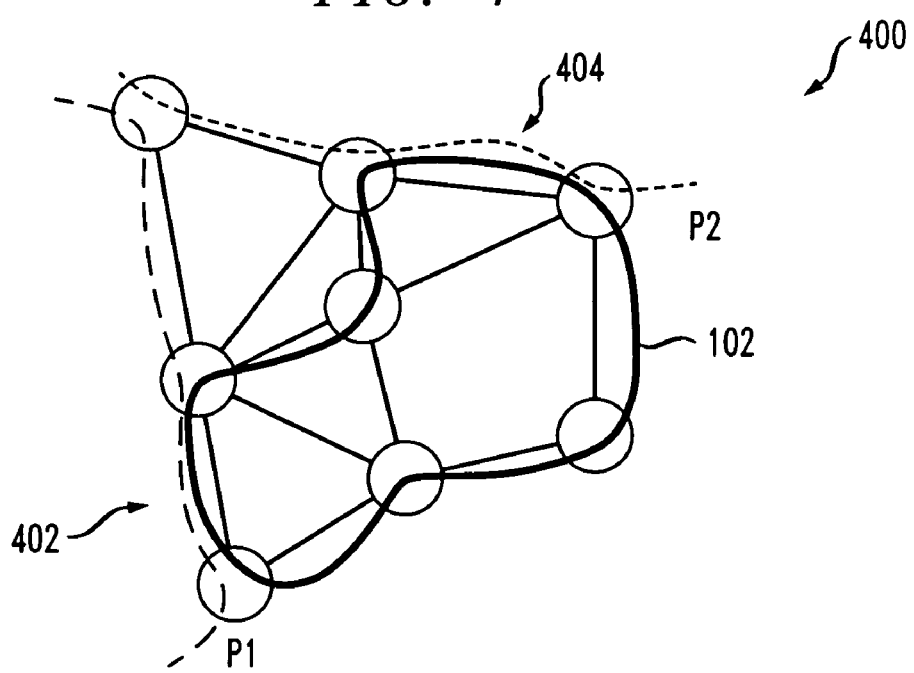
FIG. 4 is a diagram illustrating two paths before a failure in accordance with the network of FIG. 1.
Figure 5:
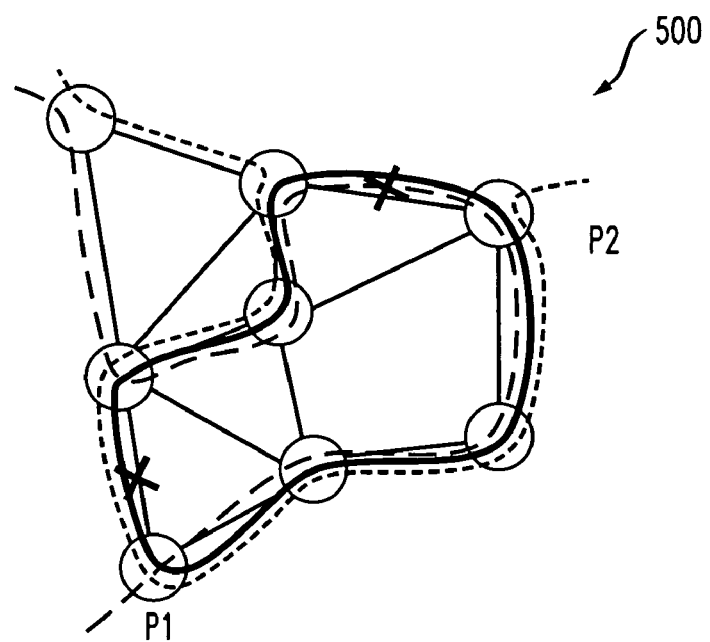
FIG. 5 is a diagram illustrating two individual failures in accordance with the network of FIG. 1.

In case of:
node failures or;
double link failures, this may result in misconnections, i.e., two independent paths become accidentally connected. FIGS. 4 and 5 illustrate this issue.

In example 400 of FIG. 4, two paths P1 and P2 are shown. For each path, one segment is protected by an on-cycle link of the p-cycle 102 of FIG. 1. Such protected segment is denoted as 402 for P1 and 404 for P2. In case of a link failure on that segment, traffic is bridged around the other way of the p-cycle. For a single failure of the link used by path P1 or for a single failure of the link used by P2, this does not create a problem and example 500 of FIG. 5 shows how the traffic is rerouted for both cases.

Figure 6:
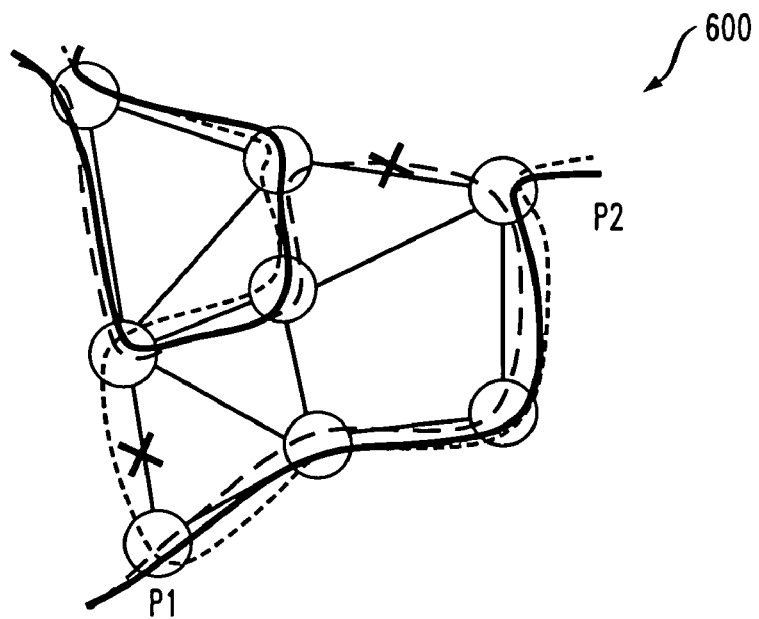
FIG. 6 is a diagram illustrating possible misconnections in accordance with the network of FIG. 1.

Now, when both links fail at the same time, the two paths may become connected through the four nodes in the upper left corner of example 600 of FIG. 6, or through the four nodes on the lower right side.

A similar type of misconnection can be created due to the failure of a complete node.

In MS-SPRING/BLSR, rings misconnections are avoided by means of squelching. Squelching uses information transported over the K1/K2 overhead bytes of the SDH/SONET signal to infer the node IDs of the switching nodes and together with the local ring maps to detect potential node isolations. In such cases, an alarm indication signal (AIS) is inserted into those timeslots where misconnections could occur.

To avoid misconnections in p-cycles, it becomes necessary to abandon the autonomy of the nodes on the p-cycle in case of a failure and to introduce synchronization between them. This requires an additional communication channel between the nodes. Re-use and reinterpretation of the existing K1/K2 bytes is not appropriate for a number of reasons:

The information must be available on path layer and not on multiplex section/line layer.

It would prevent any potential overlay with MS-SPRING/BLSR in the future.

Since it is also unlikely that the other unused SDH/SONET overhead bytes can be used for that purpose (at least current hardware is typically not able to access and process those bytes), a solution must rely on an out-of band communication channel or run on top of the existing DCC. P-cycles are, in general, not restricted by their length (as opposed to maximal number of 16 nodes in an MS-SPRING/BLSR ring) and in order to handle failures safely, communication is at least required one time around all nodes in the p-cycle. That is, the pure switching time in the two end nodes of a p-cycle will be enlarged by the time of sending a signaling message around the p-cycle plus some processing time for that message in each node.

Thus, principles of the invention realize that some mechanism to uniquely identify p-cycles and links in the network is required.

A further observation is that in SDH/SONET networks unidirectional failures also must be considered. The direct failure is only visible on the node adjacent to the failure in the direction of the traffic. In order that both nodes on the p-cycle initiate their actions appropriately, there should be a mechanism which informs the head end to bridge the signal on the p-cycle to support the switching action by the tail end. In SDH/SONET systems, this can be achieved by using remote defect indications (RDI) for most of the defects. For some defects, e.g., signal degrade (SD), an RDI is not defined, and the signaling protocol of the invention could be used to cover these unidirectional failures.

B. Node Failures

The original p-cycle concept has not taken node failures into account. Later on, the concept of node-encircling p-cycles was developed, and primarily intended for Internet Protocol (IP) based networks. Note that in these IP networks, the problem of misconnections does not exist as each packet carries its destination address.

The first problem is to identify the node failure as such and then to distinguish it from a single link failure by the nodes on the encircling p-cycles. This is necessary in order to activate the appropriate actions either for a node-encircling p-cycle or for a normal p-cycle, covering a link failure. For this purpose, principles of the invention realize that a signaling protocol is necessary.

In a second step, the traffic across the failed node has to be restored while traffic entering or leaving the meshed network in the failed node is lost. That is, only transit traffic has to be taken into account for restoration.

Figure 7:
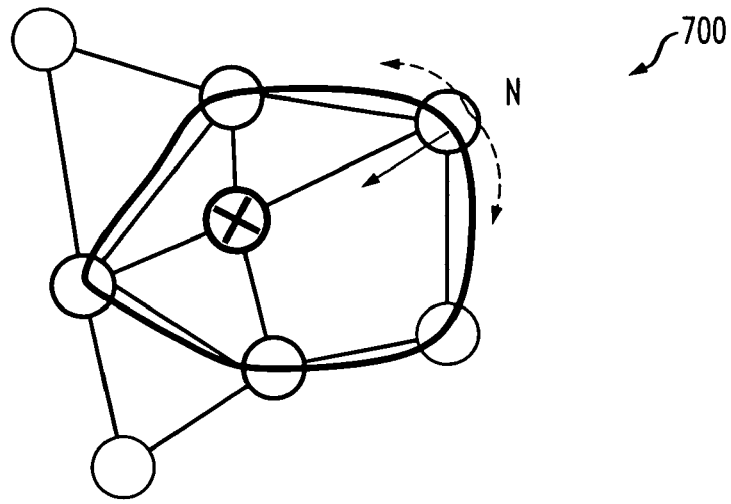
FIG. 7 is a diagram illustrating the concept of a node encircling p-cycle.

The node encircling p-cycle requires including all nodes which are adjacent to the assumed failed node (but not this node itself). The encircling p-cycle has to be dimensioned such that the transit input bandwidth of each link into the failed node is available on the two associated links of the encircling p-cycle. This will guarantee that all input traffic through the node can be protected. This is illustrated for the ingress traffic of node N in example 700 of FIG. 7.

C. Fragmentation

When SDH/SONET paths of different bandwidth (e.g., vc3, vc4, vc4-4c, vc4-16c and their SONET equivalents) are provisioned, they can only start on dedicated positions and must allocate contiguous time-slots.

Typically, in an SDH/SONET network, there is a mixture of paths of different bandwidth rates and there might be no homogenous rate to form an efficient associated p-cycle.

To apply p-cycles to the SDH/SONET network means therefore to select one of the following choices:

Partition the network into capacity layers (i.e., for vc3, vc4, vc4-4c, vc4-16c, etc.) services where each layer just supports a dedicated bandwidth rate and no mixing is allowed. Then, apply p-cycles for each layer independently. Especially, when some layers are sparsely populated, this will create an inefficient p-cycle design.

Make the p-cycles and associated hardware aware of the sub-structure of each port. Using the so-called "pipe-mode" as has been implemented for SONET networks could, for instance, support this.

In both cases, the capacity efficiency of such a network is obviously worse than in a network which supports a homogenous traffic rate.

Accordingly, based on the above described issues associated with p-cycles and carrier class requirements associated with SONET/SDH architectures, principles of the invention realize that proper operation of p-cycles in an SDH/SONET network requires the addition of a signaling protocol. The remainder of the detailed description will now describe an illustrative p-cycle signaling protocol.

II. P-cycle Signaling Protocol

Principles of the invention provide a signaling methodology wherein the above-described problem of misconnection is not possible. Moreover, the associated signaling is completely distributed, thus removing any single point of failure in the network.

Furthermore, principles of the invention provide a distributed signaling scheme that can be used to restore link failures along pre-provisioned p-cycles. The signaling reserves resources (e.g., cross-connects) for restoring a connection before actually completing the bridging and switching. In case there is contention due to node or multiple link failures, the restoration process for one or more connections will be aborted. Thus, misconnection can not occur. Since the restoration signaling messages need to refer to associated p-cycles, a distributed p-cycle ID assignment scheme is provided for this purpose.

A. Definitions

Node: A network element (NE) identifies a node. If there are multiple NE at a location, each NE is distinguished as a node.

Link: A link connects two nodes.

Channel: Portion of the link that acts as a unit in OTN. If a link is of an OTU-2/ODU-2 rate, and if we setup OTNs for 2.5 G (ODU1), then the link would consist of 4 channels.

P-cycle network: Set of channels that participate in a p-cycle. These include all the cycle links that carry working and protection traffic, and all the straddling links.

P-cycle id (PID): P-cycle id identifies a p-cycle. This id need not be unique across the NE network. But a node must be able to uniquely identify a p-cycle using this id. For example, if there are two p-cycles that are node disjoint, they could use the same id. P-cycle id can be either explicit or implicit. In explicit p-cycle id, control messages explicitly carry the p-cycle id. In implicit p-cycle id, p-cycles are identified by the interface that received the message. The messages need not carry the p-cycle id explicitly.

Node id (NID): Node id uniquely identifies a node in a p-cycle network. NID of a node need not be same on two different p-cycle networks. If we restrict the number of nodes in a p-cycle network to 16, then NID can be of length 4 bits.

Channel id (CID): Channel id uniquely identifies a channel in a p-cycle network. This is represented as two NIDs.

B. Message Format

Figure 8:
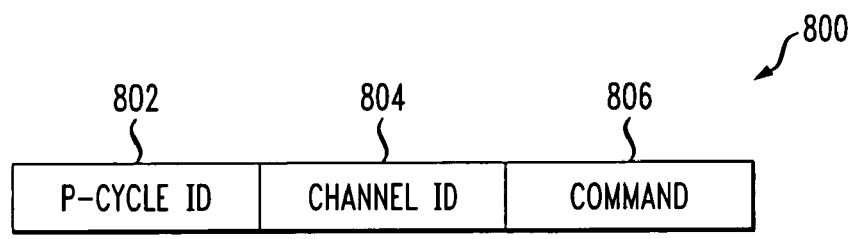
FIG. 8 is a diagram illustrating a p-cycle message format, according to an embodiment of the invention.

FIG. 8 illustrates an illustrative message format 800 for use in the p-cycle signaling methodology of the invention. As shown, the message format includes a p-cycle identifier (PID) field 802, a channel identifier (CID) field 804, and a command field 806. P-cycle ID need not be present if the node using the interface/time slot in which the message has arrived can identify the p-cycle. For explicit p-cycle ID, various methods for assigning an ID to the p-cycle may be employed. The method used must be able to assign a p-cycle ID which is unique for all nodes in the cycle. However, the ID can be the same for two p-cycles that do not share a node. P-cycle ID may be assigned in a centralized or a distributed fashion. The only constraint on the p-cycle ID is that if a node is part of two p-cycles, then their ID can not be the same. Further, if p-cycle calculation is done centrally (e.g., as a task of the network management system), this assignment could be done when provisioning the cross-connections of the p-cycle. The network management system could then easily take care for uniqueness.

Channel ID is the identifier of the channel for which the request/command has been issued. Some of the commands may be XC_RESERVE, XC_RELEASE, XC_SUCCESS, XC_FAIL, XC_SUCCESS2. "XC" refers to cross-connect. The commands specific functionalities will be described below.

C. Database at a Node

Figure 9:
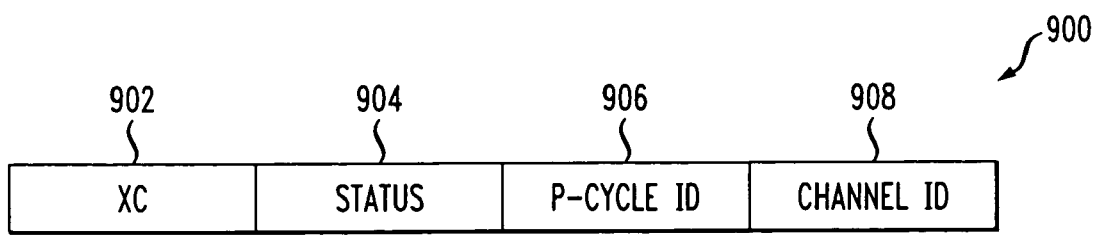
FIG. 9 is a diagram illustrating a database format for maintaining cross-connect state, according to an embodiment of the invention.

A node keeps a database of the state of cross-connects. A cross-connect (XC) is identified by (input port/tributary, output port/tributary pair). FIG. 9 illustrates an illustrative database format 900 for maintaining the cross-connect state, for use in the signaling methodology of the invention. As shown, the database format includes an XC field 902, a status field 904, a p-cycle id (PID) field 906, and a channel id (CID) field 908.

Various XC statuses include:

UNUSED: The XC is not used by any p-cycle.

USED_UNASSIGNED: The XC is part of some p-cycle, but it is not used for any protection.

USED_RESERVED: The XC is part of a p-cycle and has been reserved for restoring the failed channel in the Channel id field. We call that channel id the owner of the XC.

D. Messages and Actions

The following terms are used.

Switch—tail end of the failed link. It takes the backup and puts it to primary. It is also called select.

Bridge—head end of the failed link, puts the signal to both primary and backup.

XC_RESERVE(PID, CID)

If the cross connect is in USED_UNASSIGNED state, reserve the cross connect for the channel CID and forward the message to next node. If the channel is adjacent to this node, do a bridge on one direction (if not already done), switch (select) on the other direction and send XC_SUCCESS(PID, CID) in either direction.

If the XC is in USED_RESERVED stage, send a XC_FAIL (PID,CID) to upstream (previous node)

XC_FAIL(PID, CID)

If this node had issued the XC_FAIL (this can be inferred from CID), then unreserve the XC from the channel CID and send XC_RELEASE(PID, CID) in the reverse direction. Otherwise, forward the message downstream.

XC_RELEASE(PID, CID)

If the XC is reserved for the channel CID, release the reservation by making the status USED_UNASSIGNED. Forward the request downstream.

XC_SUCCESS(PID, CID)

If the channel CID is not adjacent to this node, forward the signal downstream.

If the channel CID is adjacent to this node, do a switching. If non-revertivee, make the bridge connection to straight and send a XC_SUCCESS2(PID, CID).

XC_SUCCESS2(PID, CID)

If the channel CID is not adjacent to this node, forward the signal downstream.

If the channel CID is adjacent to this node, make the bridge connection to straight (remove signal from the primary path).

LINK_UP(PID,CID)

A node sends this message when an adjacent span, which had failed, has recovered. Nodes adjacent to other failed links can re-initiate a restoration after receiving these messages.

IDLE_MESSAGE(PID,0)

Used when none of the above messages are going through the channel.

E. Node Details (i) Loss of Signal

If the XC is in USED_UNRESERVED state, the node starts the restoration. It first reserves the cross-connect for the failed channel. It sends the XC_RESERVE(PID, CID) for the channel in the "far side" and bridges the cross-connect.

After all the XCs are reserved, the node will receive a XC_SUCCESS(PID, CID) message from the other end of the channel. The node will do a switch (select) and make the bridge connection to straight connection to backup path.

If the XC is in USED_RESERVED state, there is second failure. The following actions are taken:

The failed channel is straddling span: In this case, current failure cannot be restored, but the existing restoration is unaffected. Here no action needs to be taken.

The failed channel is in-cycle span and owner the XC is an adjacent in-cycle span: In this case, the existing restoration is affected. The node releases the XC and sends a XC_RELEASE. Note that if this was a bi-directional failure, this action will not have any effect since the node will be isolated.

The failed channel is in-cycle span and owner the XC is a straddling span: In this case, the existing restoration may or may not be affected. If the existing restoration is affected, the node releases the XC and sends a XC_RELEASE(PID, CID). Otherwise, no action taken.

The owner of the XC is not adjacent span. The node informs the end nodes of the owner by sending a XC_FAIL(PID, CID) with channel id of the owner in either direction.

(ii) Second Failure

When there is a second failure that affects the restored path, the nodes adjacent to the current restored channel initiates cross-connect release. These nodes get the information on second failure either direction (LoS if the second failure is in an adjacent span) or from other nodes through XC_FAIL (PID, CID). In some cases, this information may also come using XC_RELEASE(PID, CID) coming from the other end of the CID.

When a node detects the second failure, it releases the cross-connect, makes the bridge connection back to primary and sends a XC_RELEASE(PID, CID) in either direction.

(iii) Timeout Mechanism

If a node that initiates a restoration by sending XC_RESERVE does not receive a XC_SUCCESS within sufficient time duration, then that node will initiate a XC_RELEASE. This is to avoid infinite waiting and holding of resources in cases where the connection cannot be restored.

(iv) Pseudo Code

Illustrative pseudo code for the node processing is given below (note that variable XC_OWNER contains the owner of the cross-connect):

```
If (CID == ID of the adjacent span)
{
    Switch (request) {
    Case XC_RESERVE:
        If (XC_OWNER == NULL || XC_OWNER == CID) {
            XC_OWNER = CID;
            Reserve the XC for CID;
            Select (switch) the signal from backup if not already done;
            Setup the bridge (if not already done);
            Send XC_SUCCESS(PID, CID) in either direction
        } else {
            Send XC_FAIL(PID, CID) on the reverse path;
        }
        break;
    Case XC_SUCCESS:
        Switch (select) signal from backup, if not already done
        Make the bridge to straight connection
        Send XC_SUCCESS2(PID,CID) in both direction
        Break;
    Case XC_SUCCESS2:
        Make the bridge to straight connection
        Break;
    Case XC_FAIL:
        XC_OWNER = NULL;
        Un-reserve the XC;
        Make the bridge to straight connection
        Send XC_RELEASE(PID, CID);
        Break;
    Case XC_RELEASE:
        If (XC_OWNER == CID) {
            XC_OWNER = NULL;
            Un-reserve the XC;
            Make the bridge to straight connection
        }
```

```
    Case LINK_UP:
        If (this node had initiated the message)
            Remove the message;
        Else
            Forward the message in the same direction;
        If (there is an un-restored, failed adjacent link)
            Restart the restoration;
    }
} else // CID is not of adjacent span
{
    Switch (request) {
    Case XC_RESERVE:
        If (XC_OWNER == NULL) {
            XC_OWNER = CID;
            Reserve the XC for CID;
            Forward the message in the same direction.
            If (the message cannot be forwarded due to failure)
                Send XC_FAIL(PID, CID) on the reverse path;
        } else If (XC_OWNER == CID) {
            Forward the message in the same direction.
        } else {
            Send XC_FAIL(PID, CID) on the reverse path;
        }
        break;
    Case XC_RELEASE:
        If (XC_OWNER == CID) {
            XC_OWNER = NULL;
            Un-reserve the XC;
            Forward the message in the same direction
        }
        break;
    Case XC_SUCCESS:
    Case XC_SUCCESS2:
    Case XC_FAIL:
    Case XC_RELEASE:
        Forward the message in the same direction
        Break;
    Case LINK_UP:
        Forward the message in the same direction
        If (there is an un-restored, failed adjacent link)
            Restart the restoration;
    }
}
```

F. Correctness

In this section, we show that the protocol is correct. First we show that there are no miss-connections and then we explore various failure case scenarios.

(i) Misconnections

Note that a misconnection between nodes A and B can occur if and only if the following three conditions hold.

If node A puts data to the backup path using a bridge

If node B selects (switch) the data from the backup path

The protection is not against the failure of span AB

In the inventive protocol, a node does not do a bridge for the primary channel AC, unless the XC is reserved for AC at node A. Hence, if some channel is already using the XC connect for backup, node A will not use it for bridging.

Node B does a switching in two cases: on receiving a XC_SUCCESS message or on receiving XC_RESERVE message for an adjacent span. A node receives XC_SUCCESS only after reserving all the cross-connects in the backup path. Similarly, a node receives XC_RESERVE for an adjacent span, only after reserving all the cross connects in the backup path. Hence, there will not be a misconnection at node B.

(ii) Use Cases

Figure 10:
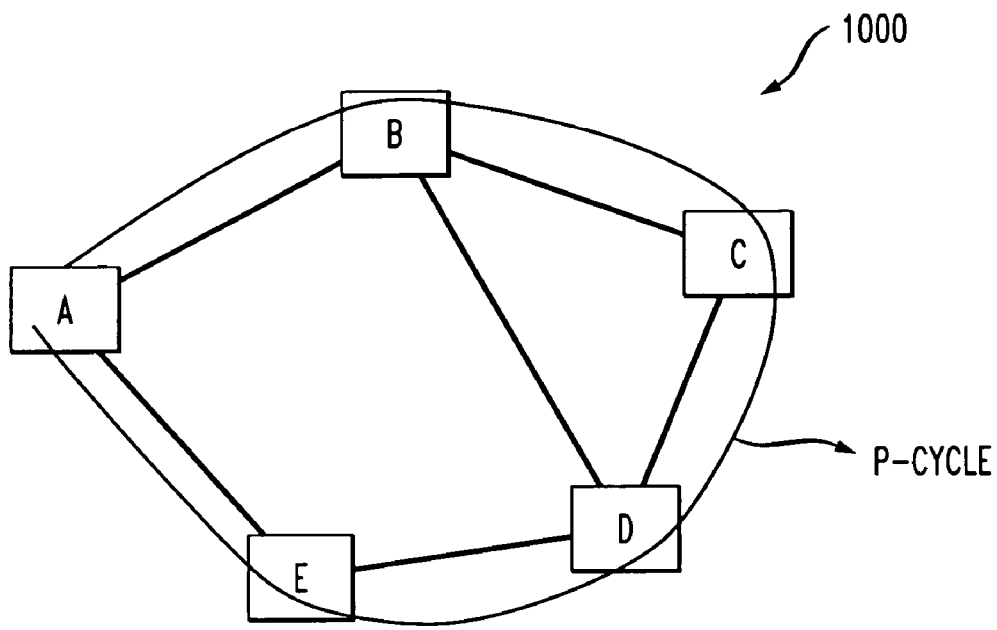
FIG. 10 is a diagram illustrating an example network for use in illustrating a p-cycle signaling protocol, according to an embodiment of the invention.

In this section, we show that various failure cases work correctly for the protocol. We use the network of example 1000 of FIG. 10 in all the cases.

(1) Unidirectional Link Failure

Assume the failure of link AE. Node E will detect a LoS, reserve XC, bridge the backup from primary EA and send a XC_RESERVE request to node D. Node D will reserve the XC and forward the request to Node C. The same happens at Node C and Node B. Node A on receiving XC_RESERVE, bridges the backup from primary AE, selects the signal from the backup BA and sends a XC_SUCCESS in both the directions.

Node E will receive the XC_SUCCESS from the longer path. On receiving, the node selects the signal from the backup path. If non-revertive, Node E removes the primary EA from the bridge and sends a XC_SUCCESS2 to node A. Node A, on receiving, removes the primary AE from the bridge.

(2) Bi-directional Link Failure

Assume the failure of link AE. Node E will detect a LoS (loss of signal alarm), reserve XC, bridge the backup from primary EA and send a XC_RESERVE request to node D. Node D will reserve the XC and forward the request to Node C. The same happens at Node C and Node B.

Node A will also detect LoS at the same time, and reserve XC, bridge backup from primary AE and send a XC_RESERVE to node B. If Node B had already received the same message from Node C (which originated from A), it will just forward the new message to node C. Otherwise, Node B will reserve the cross-connect and forward the message to the node C. The same happens on node C and Node D.

Node A will receive a XC_RESERVE that originated from node E and XC_SUCCESS from Node E. In both cases (whichever gets first), the node selects the signal from the backup BA. On receiving XC_RESERVE, it will send a XC_SUCCESS in both the directions. If non-revertive, on receiving XC_SUCCESS, Node A removes the primary AE from the bridge and sends a XC_SUCCESS2 to node E.

The same processing happens at Node E.

Both nodes will ignore any XC_RESERVE, XC_RESERVE and XC_SUCCESS2, if their corresponding actions are previously taken due to arrival of an earlier message.

(3) Straddling Link Failure

A straddling link can have two backup paths: using either half of the p-cycle. During the provision time, one particular half is assigned to each of the p-cycle. Only that backup path will be used to protect the straddling link, even if that backup path is unavailable and the other half is available. For example, path BCD will be used to protect the link BD.

Once the association of straddling link is made to a half of p-cycle, the signaling is similar to cycle link failure case.

(4) Node Failure

P-cycles can not protect against node failures. But we need to guarantee that there are no misconnections.

Assume the failure of Node E. Both Node A and Node D will detect LoS and initiate the restoration by sending XC_RESERVE for links EA and ED, respectively. Assume that node B receives the message first from Node A and Node C receives the message first from Node D. These nodes reserve their respective cross-connects for link EA and link ED, respectively. Node B, on receiving a XC_RESERVE for link ED, will send a XC_FAIL back to D. Similarly, Node C will send a XC_FAIL back to A. These nodes, after receiving XC_FAIL nodes A and D, will initiate the XC release.

Hence, no traffic will be restored and there is no misconnection.

(5) Other Failure Cases

Other failure cases like multiple link failures; multiple unidirectional and bidirectional failures can be similarly analyzed. The timeout mechanism at the node initiating a restoration helps to avoid holding a resource (cross-connect) for a long duration of time where the connection can not be restored and signaling does not go thru due to unidirectional link failures during the signaling.

In extreme cases, the XC may be reserved indefinitely without any restoration. One such scenario is the following. On a link failure, the two end nodes initiate the reservation. Before the restoration is complete both nodes fail. These extreme cases can be handled by more signaling after the restoration and timeout mechanism.

(6) Recovery After Failure

When a link is recovered after failure, the end nodes of the link send a LINK_UP message to the p-cycle. The node also initiates the XC_RELEASE if cross-connects were reserved for the link. Other nodes that have its incident link failed, on finding a LINK_UP, re-initiate the XC_RESERVE.

G. Near Side Switching for OTN

The inventive protocol can also support near side switching for OTN with some extension. Note the XC_RESERVE message is sent only in one direction (far side). For near side switching, the XC_RESERVE message has to be sent in both directions.

H. Shared Link Restoration

In this section, we explain the difference between p-cycle restoration and shared link restoration. P-cycle restoration is a special case of shared link restoration, where the sharing of a link is limited to only links (both cycle and straddling) participating in the p-cycle.

Both restoration protocols can be summarized in three steps:

Failure detection.
Cross-connect reservation/setup.
Switching to/from backup path.

The implementation of the p-cycle restoration and shared link restoration differs only in step 2.

(i) P-cycle id and Channel id

P-cycle id is part of the messages in p-cycle restoration. This field is redundant if the node can uniquely identify the channel for which messages originate, for example, if we use implicit p-cycle id.

For a link restoration, we do not have to use a p-cycle id as long as a node can uniquely identify all the channels it is protecting using channel ids.

(ii) Cross-Connect Setup

The main difference between a p-cycle restoration and shared link restoration is in cross-connecting setup after failure at the intermediate nodes. In p-cycle, cross-connects are setup before failure, whereas in link restoration, it can be done only after failure. This has two implications.

Restoration time includes XC setup time.
It affects the signaling.

Since XC can be setup very fast, the first issue is not significant. The second issue is more significant. When the intermediate nodes get a XC_RESERVE message, it has to know what XC to setup. Then, only it can forward the message to next node. If a node can keep track of reservations (i.e., which channel uses what XC), then a link restoration scheme can be implemented.

III. Illustrative Hardware Implementation

Figure 11:
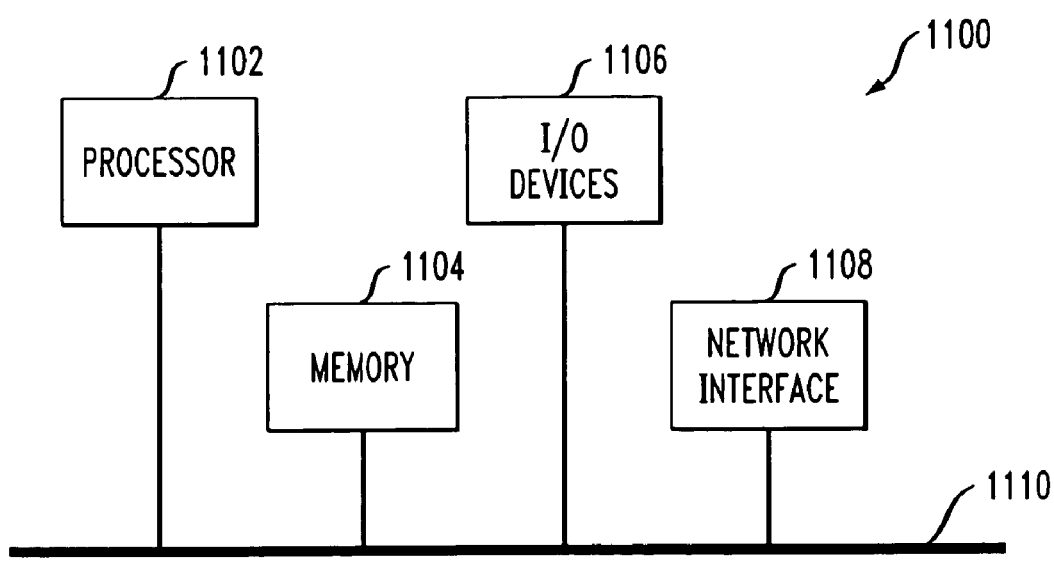
FIG. 11 is a diagram illustrating an architecture of a computer system suitable for implementing a p-cycle signaling protocol, according to an embodiment of the invention.

FIG. 11 illustrates an architecture of a computer system suitable for implementing a p-cycle signaling protocol, according to an embodiment of the invention. More particularly, it is to be appreciated that computer system 1100 in FIG. 11 may be used to implement and perform the methodologies of the invention, as illustratively described above in the context of FIGS. 1 through FIG. 10. Also, it is to be understood that one or more network elements may implement such a computing system 1100. Of course, it is to be understood that the invention is not limited to any particular computing system implementation.

Thus, computing system 1100 can represent a node in an OTN. Not expressly shown are cross-connects that the computing system controls in accordance with the signaling methodologies described above.

In this illustrative implementation, a processor 1102 for implementing at least a portion of the methodologies of the invention is operatively coupled to a memory 1104, input/output (I/O) device(s) 1106 and a network interface 1108 via a bus 1110, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism to provide inputs used by a system of the invention. Alternatively, the inputs could be read into the system from a diskette or from some other source (e.g., another computer system) connected to the computer bus 1110. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 1100 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1102.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in at least one node of a data communication network for recovering from a failure, wherein the data communication network includes multiple nodes and multiple links for connecting the multiple nodes, comprising the steps of:

obtaining notification of the failure at the at least one node; and implementing a pre-configured protection cycle plan in response to the failure wherein the at least one node performs at least one signaling operation with at least another node identified as part of a first proposed restoration in the pre-configured protection cycle plan such that a resource of the at least another node is reserved for use in the first proposed restoration prior to using the resource to implement the first proposed restoration;

wherein the at least one signaling operation comprises: (i) the at least one node sending a first signal to the at least another node requesting that the resource of the at least another node he reserved for use in the first proposed restoration, and (ii) the at least one node receiving a second signal from the at least another node responsive to the first signal;

wherein a contention due to one of a node failure or multiple link failures in the network is detected responsive to the second signal comprising an indication that the resource of the at least another node is already reserved for use in a restoration other than the first proposed restoration;

wherein the first proposed restoration is not implemented when the contention due to one of a node failure or multiple link failures in the network is detected;

wherein the at least one node sends a third signal to the at least another node responsive to the second signal comprising an indication that the resource of the at least another node has been successfully reserved for use in the first proposed restoration; and wherein the at least another node uses the reserved resource to implement the first proposed restoration responsive to the third signal.

2. The method of claim 1, wherein the pre-configured protection cycle plan implementation step further comprises at least one of:
the node sending at least one message to another node in the data communication network; and
the node receiving at least one message from another node in the data communication network.

3. The method of claim 2, wherein the at least one message comprises one or more of an identifier of the pre-configured protection cycle plan, an identifier of a channel in the pre-configured protection cycle plan, and a command.

4. The method of claim 2, wherein the at least one message serves to reserve one or more resources.

5. The method of claim 4, wherein reservation of the one or more resources is performed before resources bridging and resources switching are completed.

6. The method of claim 2, wherein the at least one message serves to acknowledge successful reservation of one or more resources.

7. The method of claim 2, wherein the at least one message serves to release a reservation of one or more resources.

8. The method of claim 1, wherein the node stores a status associated with one or more resources for use in implementing the pre-configured protection cycle plan.

9. The method of claim 1, wherein the data communication network comprises an optical transport network and implementation of the pre-configured protection cycle plan comprises setting up one or more optical cross-connects in the network such that traffic associated with a demand may be switched from a primary path to a backup path in order to recover from the failure.

10. The method of claim 1, wherein a second proposed restoration is considered after the first proposed restoration is not implemented.

11. Apparatus for use in at least one node of a data communication network for recovering from a failure, wherein the data communication network includes multiple nodes and multiple links for connecting the multiple nodes, comprising:
a memory; and
at least one processor coupled to the memory and operative to: (i) obtain notification of the failure at the at least one node; and (ii) implement a pre-configured protection cycle plan in response to the failure wherein the at least one node performs at least one signaling operation with at least another node identified as part of a first proposed restoration in the pre-configured protection cycle plan such that a resource of the at least another node is reserved for use in the first proposed restoration prior to using the resource to implement the first proposed restoration;
wherein the at least one signaling operation comprises: (i) the at least one node sending a first signal to the at least another node requesting that the resource of the at least another node be reserved for use in the first proposed restoration, and (ii) the at least one node receiving a second signal from the at least another node responsive to the first signal;
wherein a contention due to one of a node failure or multiple link failures in the network is detected responsive to the second signal comprising an indication that the resource of the at least another node is already reserved for use in a restoration other than the first proposed restoration;
wherein the first proposed restoration is not implemented when the contention due to one of a node failure or multiple link failures in the network is detected;
wherein the at least one node sends a third signal to the at least another node responsive to the second signal comprising an indication that the resource of the at least another node has been successfully reserved for use in the first proposed restoration; and
wherein the at least another node uses the reserved resource to implement the first proposed restoration responsive to the third signal.

12. The apparatus of claim 11, wherein the pre-configured protection cycle plan implementation operation further comprises at least one of:
the node sending at least one message to another node in the data communication network; and
the node receiving at least one message from another node in the data communication network.

13. The apparatus of claim 12, wherein the at least one message comprises one or more of an identifier of the pre-configured protection cycle plan, an identifier of a channel in the pre-configured protection cycle plan, and a command.

14. The apparatus of claim 12, wherein the at least one message serves to reserve one or more resources.

15. The apparatus of claim 14, wherein reservation of the one or more resources is performed before resource bridging and resource switching are completed 16. The apparatus of claim 12, wherein the at least one message serves to acknowledge successful reservation of one or more resources.

17. The apparatus of claim 12, wherein the at least one message serves to release a reservation of one or more resources.

18. The apparatus of claim 11, wherein a status associated with one or more resources is stored in memory for use in implementing the pre-configured protection cycle plan.

19. The apparatus of claim 11, wherein the data communication network comprises an optical transport network and implementation of the pre-configured protection cycle plan comprises setting up one or more optical cross-connects in the network such that traffic associated with a demand may be switched from a primary path to a backup path in order to recover from the failure.

20. A method for use in an optical transport network for recovering from a failure, wherein the optical transport network includes multiple nodes and multiple links for connecting the multiple nodes, comprising the steps of:
determining whether the failure is a single link failure or one of a node failure and a multiple link failure; and
implementing a pre-configured protection cycle plan when the failure is a single link failure but not when the failure is one of a node failure and a multiple link failure;
wherein implementation of the pre-configured protection cycle plan comprises at least two nodes communicating in accordance with a signaling protocol in an attempt to reserve one or more cross-connects;
wherein the signaling protocol comprises: (i) at least a first node sending a first signal to at least a second node requesting that the one or more cross-connects be reserved for use in the pre-configured protection cycle plan, and (ii) the at least first node receiving a second signal from the at least second node responsive to the first signal;

wherein the failure is determined to be one of a node failure and a multiple link failure responsive to the second signal comprising an indication that the one or more cross-connects are already reserved for use in another plan;

wherein the at least first node sends a third signal to the at least second node responsive to the second signal comprising an indication that the resource of the at second node has been successfully reserved for use in the pre-configured protection cycle plan; and wherein the at least second node uses the reserved resource to implement pre-configured protection cycle plan responsive to the third signal.

* * * * *